Jan. 26, 1960 W. G. JESSEN 2,922,557
LUGGAGE CARRIER FOR THE TOPS OF AUTOMOTIVE VEHICLES
Filed Sept. 11, 1957 2 Sheets-Sheet 1
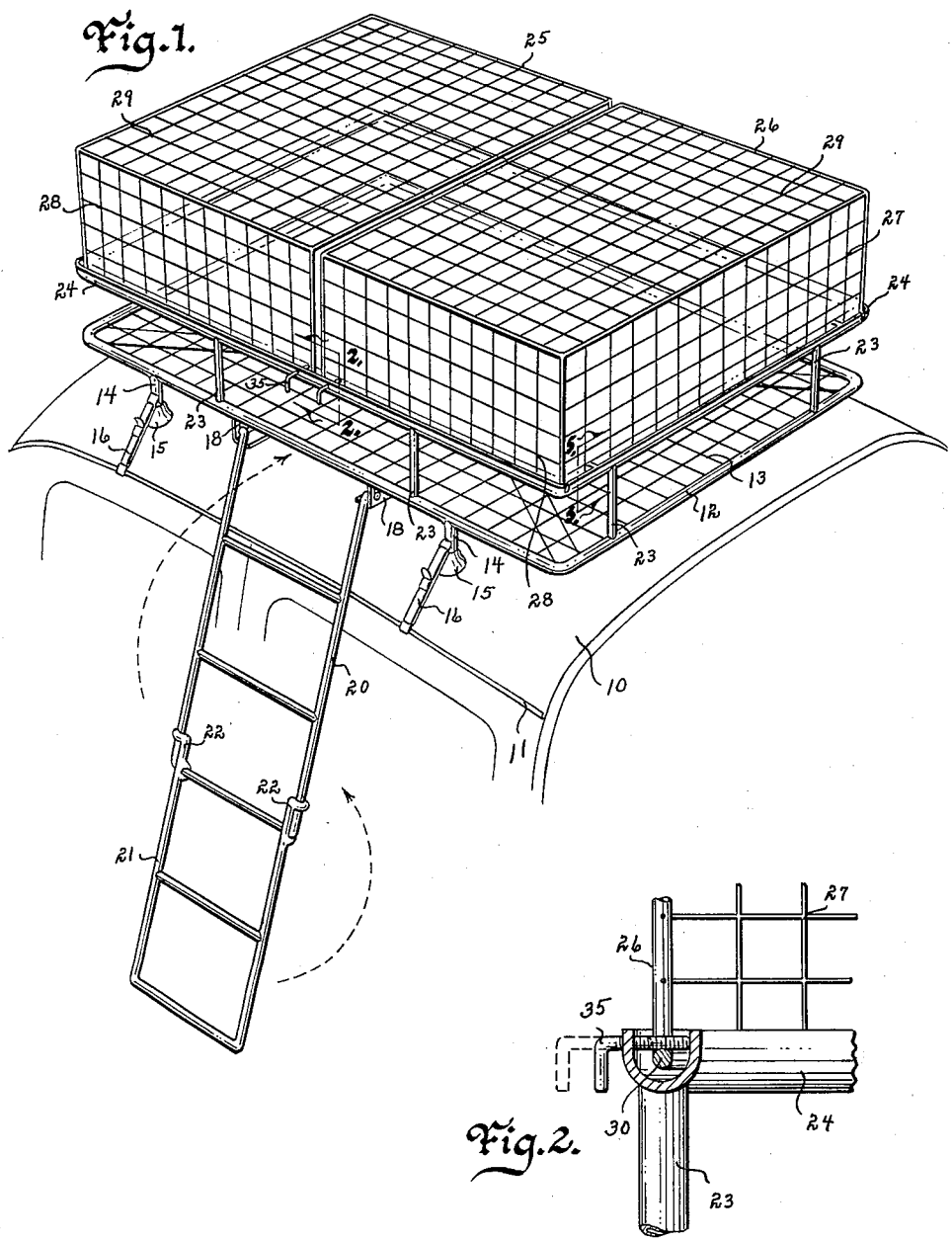
Inventor
Wilbur George Jessen
by M. Talbert Dick
Attorney
Witness
Edward P. Seeley

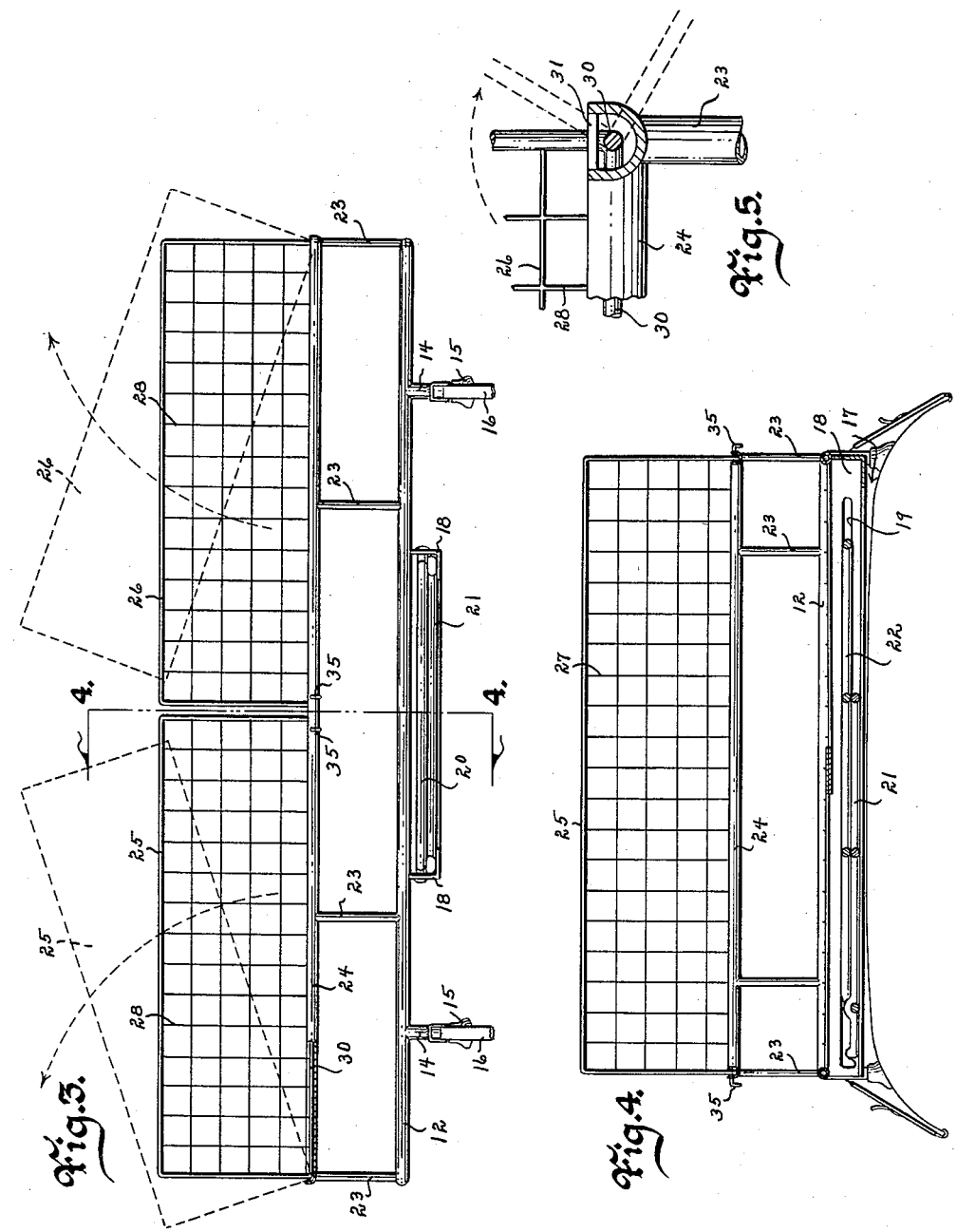

United States Patent Office 2,922,557
Patented Jan. 26, 1960

2,922,557

LUGGAGE CARRIER FOR THE TOPS OF AUTOMOTIVE VEHICLES

Wilbur George Jessen, Des Moines, Iowa

Application September 11, 1957, Serial No. 683,415

3 Claims. (Cl. 224—42.1)

This invention relates to luggage carriers, and more particularly to a luggage carrier for use on the tops of automobiles and like.

Most automotive vehicle trunks are not sufficient in size to accommodate all the luggage and items that the motorist would like to take with him. Some automobiles users employ a portion of the seating compartment of the vehicle for bags, clothes and like, but this practice is objectionable in that the riders are cramped for room, the articles obstruct vision through the windows, and in case of accident the loose items may strike and seriously injure the riders. Some attempt has been made to fasten suitcases or containers onto the top of the vehicle. The chief problem here involved is the wind attack on the matter being hauled on the vehicle top, and also the problem of getting onto the top to remove or replace the items being carried.

Therefore, one of the principal objects of my invention is to provide a luggage or like carrier for automobile tops that may incorporate ladder steps whereby the user may easily and quickly deposit in or remove articles from the carrier.

A further object of this invention is to provide a car top luggage carrier that protects the matter being transported against the wind force during the time the vehicle is in motion.

A still further object of this invention is to provide a luggage carrier for vehicle tops that is light of weight despite its great carrying capacity.

A still further object of my invention is to provide a luggage carrier that is easily opened or closed.

Still further objects of my invention are to provide a luggage carrier for vehicle tops that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device in use,

Fig. 2 is an enlarged sectional view of one of the locking means taken on line 2—2 of Fig. 1, Fig. 3 is a side view of my luggage carrier with its ladder means stored and with broken lines to illustrate the opening of the top hood covers, Fig. 4 is a cross sectional view of the device taken on line 4—4 of Fig. 3, and Fig. 5 is an enlarged sectional view of one of the hinge means taken on line 5—5 of Fig. 1.

In these drawings I have used the numeral 10 to designate the top of an automobile or like having the usual rain flange 11. It is to such a top that I secure my large carrier and which I will now describe in detail.

The numeral 12 designates an elongated horizontal rectangular frame having within it wire mesh flooring 13, as shown in Fig. 1. On each of the side rails of the frame 12 are two spaced apart downwardly extending legs 14. Each of these four legs has at its bottom end an ordinary suction cup 15. When the device is mounted on a vehicle top, these spaced apart suction cups engage the vehicle top and support my carrier. The carrier is held onto the vehicle top by ordinary adjustable hook straps 16, having their outer ends hooked over the rain flanges 11 of the vehicle and their inner ends secured to the frame 12. The length of the legs 14 is such that a space 17 exists between the car top and the frame 12 and its mesh 13, as shown in Fig. 4. The numeral 18 designates two spaced apart angle irons having the top of their vertical flanges secured to the bottom of the frame 12. These angle irons are transversely arranged relative to the elongated frame 12 as shown in Fig. 3, and each has an elongated slot 19 in its vertical flange. The horizontal lower flanges of these two angle irons extend toward each other to provide two supporting ledges for the stored ladder. This ladder has an upper portion 20 with its two upper ends extending laterally and outwardly to slidably and rotatably extend through the two slots 19, respectively. The numeral 21 designates the lower portion of the ladder having its upper end hinged to the lowest rung of the ladder 20, and two rigid arms 22 extending longitudinally upwardly to engage the outer side of the two side rails respectively of the upper ladder 20, as shown in Fig. 1. By this construction the lower ladder is limited in its outer swing movement relative to the upper ladder. With the carrier mounted on a vehicle top and the two ladder sections lowered as shown in Fig. 1, a rigid ladder is provided extending from the ground to the frame 12, thereby making it easy for the user to step up the ladder for the placement of articles in the carrier or their removal. When the ladder is not in use, the lower portion 21 is folded back and under the upper portion 20, and the unit then slid into the space between the two angle irons with the two horizontal flange ledges supporting the stored ladder. A catch may be used to detachably retain the ladder in stored position, as shown in Fig. 4. Whenever it is desired to use the ladder, its connected portion is slid outwardly to an effective position shown in Fig. 1. The numeral 23 designates a plurality of posts extending upwardly from the frame 12. Secured to the top of these posts is a horizontal railing frame 24, U-shaped in cross section, as shown in Fig. 5. If desired, wire mesh may be extended between the frame 12 and the frame 24. The frame 12, its bottom 13, the posts 23, and top frame 24 create a frame open top box portion. To the top of this box portion I hinge two oppositely arranged hoods 25 and 26. Each hood has a back end portion 27, sides 28, and a top 29. Each is open at its bottom and adjacent ends as shown in Fig. 1. While the hoods may be of any suitable construction, I recommend they be made of frame construction filled in by wire mesh and to particularly have a bottom frame 30 resting in the U-frame 24, as shown in Fig. 4. The outer back end portion of each of the hood portions is hinged in the U-shaped frame 24 by having its frame 30 rotatably mounted in the U-frame 24 and retaining bars 31 on the frame 24 and extending above the frame 30 as shown in Fig. 5. By this arrangement the two hood members will have their outer ends hingedly secured and their two open ends adjacent each other. Each hood covers approximately one-half of the top area of the lower box frame. Either of the hoods may be swung upwardly and outwardly away from each other and independently of the other, as shown in Fig. 3. By the lower rod frame 30 of each of the hoods normally resting in the U-shaped frame 24, the hoods when in closed position will be successfully held in all horizontal positions. Any suitable means may be used to independently hold the hood members in a closed condition. In the drawings, I thread handles 35 longitudinally into the frame 24 as shown in Fig. 2. When these handles are screwed full into the frame 24 with the hoods in lowered condition, these handles will extend above the frame 30 of the two hood portions, thereby successfully holding them in the frame 24 and the hood in lowered condition. A handle 35 is used for each of the hoods. To release a hood for upward swinging action, the respective handle 35 is screwed outwardly until it is clear of the frame 30 of the hood to be raised. The grip portion of each of these handles may be off center so that by gravity they will hang downwardly and not become accidentally unscrewed.

The wire mesh hoods will embrace all items placed in the open box frame, retain them, and prevent them from being buffeted by the wind. If desired a canvas cover-all bag may be used inside the carrier.

Some changes may be made in the construction and arrangement of my luggage carrier for the tops of automotive vehicles without departing from the real spirit and purpose of my invention, and it is my intention to cover by my claims, any modified forms of structure or use of mechanical equivalents which may be reasonably included within their scope.

I claim:

1. In a carrier for the tops of vehicles, an open top rectangular container portion having a U-shaped upper rim portion, a means for securing said open top rectangular container portion to the top of a vehicle, a hood having an end, a top, two sides, an open end and an open bottom, a means of hinging the end of said hood to one end of said open top rectangular container portion, a second hood having an end, a top, two sides, an open end and an open bottom, a means of hinging the end of said hood to the other end of said open top rectangular container portion; said two hoods having their bottom edges extending into the U-shaped rim portion of said open top rectangular container portion when they are in closed positions, and two pin members threaded in the U-shaped rim portion of said open top rectangular container portion, and capable of being rotated to positions for engagement with said first and second hoods, respectively, whereby said hoods will be rigidly locked against opening relative to said open top rectangular container portion.

2. In a carrier for the tops of vehicles, an open top rectangular container portion having a U-shaped upper rim portion, a means for securing said open top rectangular container portion to the top of a vehicle, a hood having an end, a top, two sides, an open end and an open bottom, a means of hinging the end of said hood to one end of said open top rectangular container portion, a second hood having an end, a top, two sides, an open end and an open bottom, a means of hinging the end of said hood to the other end of said open top rectangular container portion; said two hoods having their bottom edges extending into the U-shaped rim portion of said open top rectangular container portion when they are in closed positions, and two pin members threaded in the U-shaped rim portion of said open top rectangular container portion, and capable of being rotated to positions for engagement with said first and second hoods, respectively, whereby said hoods will be rigidly locked against opening relative to said open top rectangular container portion, and two spaced apart angle irons on the bottom of said open top rectangular container portion, each having a slot adapted to slidably hingedly secure a ladder.

3. In a carrier for the tops of vehicles, an open top rectangular container portion having a U-shaped upper rim portion, a means for securing said open top rectangular container portion to the top of a vehicle, a hood having an end, a top, two sides, an open end and an open bottom, a means of hinging the end of said hood to one end of said open top rectangular container portion, a second hood having an end, a top, two sides, an open end and an open bottom, a means of hinging the end of said hood to the other end of said open top rectangular container portion; said two hoods having their bottom edges extending into the U-shaped rim portion of said open top rectangular container portion when they are in closed positions, and catch means capable of being moved to positions for engagement with said first and second hoods, respectively, whereby said hoods will be rigidly locked against opening relative to said open top rectangular container portion.

References Cited in the file of this patent

UNITED STATES PATENTS

| | | |
|---|---|---|
| 1,109,734 | Bauer | Sept. 9, 1914 |
| 1,748,282 | Ellis | Feb. 25, 1930 |
| 2,678,831 | Fisher | May 18, 1954 |
| 2,683,265 | Wayne | July 13, 1954 |
| 2,786,558 | Benkoe | Mar. 26, 1957 |
| 2,819,005 | Roberts | Jan. 7, 1958 |
| 2,840,290 | Roberts | June 24, 1958 |